Feb. 18, 1969     G. A. MITCHELL     3,428,395
FILM AND PILOT SYSTEM
Filed Feb. 23, 1966
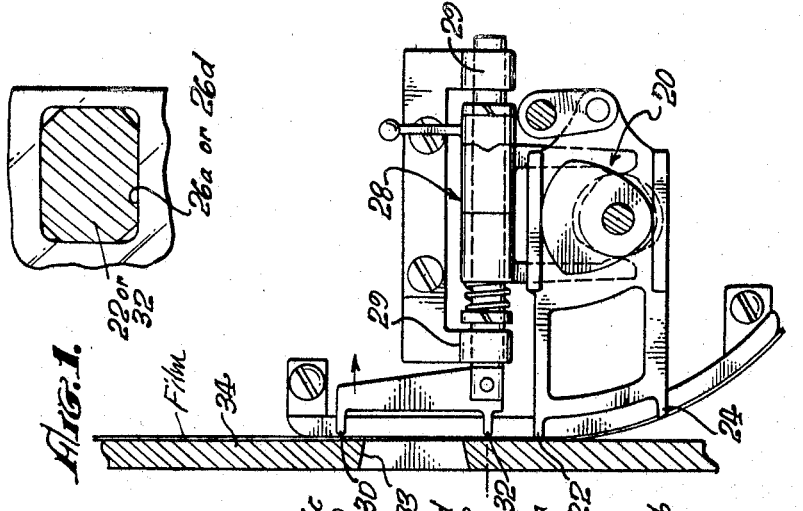
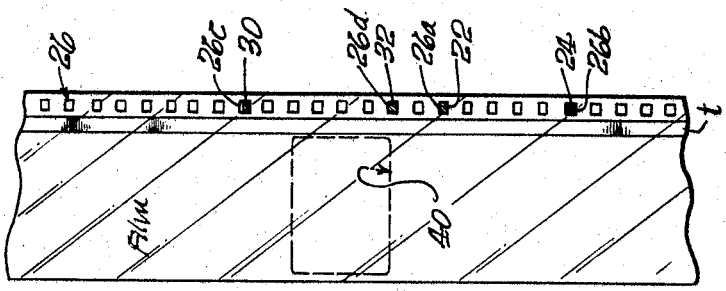
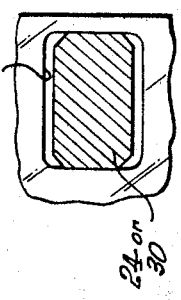
INVENTOR.
GEORGE A. MITCHELL,
By   *Jerry T. Nickelow*
ATTORNEY.

United States Patent Office 3,428,395
Patented Feb. 18, 1969

3,428,395
FILM AND PILOT SYSTEM
George A. Mitchell, 687 Prospect Crescent,
Pasadena, Calif. 91103
Filed Feb. 23, 1966, Ser. No. 529,432
U.S. Cl. 352—194                    4 Claims
Int. Cl. G03b 1/22

ABSTRACT OF THE DISCLOSURE

An intermittent film movement, for a film strip having a single row of perforations, having both pilot mechanism and film moving mechanism with the pilot mechanism having two pilot pins spaced longitudinally of the film to simultaneously engage two longitudinally spaced film perforations, one of the pilot pins accurately fitting a perforation both laterally and longitudinally, and the other fitting a perforation only laterally, while the moving mechanism has two longitudinally spaced claw pins, one of which fits a perforation both laterally and longitudinally, and the other fits a perforation only laterally.

---

This invention relates to motion picture film and film moving and positioning mechanisms, a general objective being to increase the film exposure area and at the same time to accurately position the film for each exposure.

Increase in exposure area is attained by providing in a longitudinally extending film of e.g. 35 mm. width only one longitudinal line of film perforations at or near one lateral film edge; accuracy of film positioning both laterally and longitudinally is had by providing pilot mechanism involving two longitudinally spaced pilot pins one of which accurately locates the film both transversely and longitudinally by full-fitting engagement in a sprocket perforation, while the other longitudinally spaced pilot pin engages a longitudinally spaced perforation for full-fitting laterally but not longitudinally of the film. Preferably the film exposure area is located, at least in part, between the two longitudinally spaced pilot pins. Also, preferably, the exposure area may be closer to the full-fitting pilot pin than to the other pin.

The film moving claw or other intermittent film moving mechanism also preferably has two film engaging claw pins or equivalent spaced longitudinally of the film and fitting longitudinally spaced sprocket holes in the same manner, to reasonably well locate the film for final accurate location by the pilot pins. The pilot pins, not moving like e.g. a claw pin, are capable of most accurately locating the film.

In the past development of e.g. 35 mm. film, the exposure area was, at adoption of sound film, reduced in its transverse dimension between the usual two longitudinal rows of sprocket holes, standardly requiring a sound track about 0.1″ wide next to a line of sprocket holes. That reduced the exposure area to about 0.868 inch in dimension transverse of the film and the longitudinally extending width of exposure area was then reduced to about 0.631 inch to give the desired 3 to 4 ratio. The retained standard film advance on each intermittent cycle was maintained at approximately three-quarters inch, or more accurately 0.748″, resulting in a total non-exposed area of about 0.119 inch width longitudinal of the film. My present invention makes possible an approximate sixty percent increase in exposure with concomitant full accuracy of film and exposure area positioning.

In the following description the figures given are for 35 mm. film, but as will be well understood the system of the present invention may also be applied to motion picture film of any size.

Reference is now had to the accompanying drawings showing an illustrative and typical form of the invention, and in which:

FIG. 1 is a schematic, showing a claw type film moving mechanism with its accompanying pilot device;
FIG. 2 is a schematic looking at the film from its back;
FIG. 2a is a similar schematic illustrating a vibration;
FIG. 3 is an enlarged cross-sectional showing of one pilot or claw pin, preferably the upper pilot and the lower claw pin, fitting a sprocket hole tightly only transversely; and
FIG. 4 is a similar showing of the full fitting of the other pin, preferably the lower pilot and the upper claw pin.

All the figures are approximately to scale, FIGS. 1, 2 and 2a being approximately fully size for a 35 mm. film.

In FIG. 1 a claw type intermittent film movement is shown at 20 equipped with two longitudinally spaced film engaging pins 22 and 24, spaced to engage longitudinally spaced sprocket holes 26a and 26b shown in FIG. 2. A pilot device is shown at 28 with upper and lower film engaging pins 30 and 32, spaced longitudinally of the film to engage upper and lower spaced film perforations 26c and 26d. The spacing of those film perforations 26c and 26d is, on this 35 mm. film, equal to several times the spacings between adjacent sprocket holes, here shown as six times. The vertical spacing of the claw pins 22 and 24 need not be quite as great but is preferably equal to several times the sprocket hole spacing, here shown as five times. The sprocket holes, generally designated by 26, are in a single line near one lateral edge of the film, so designated. The sound track, designated at t, is here shown as next to the line of sprocket holes, although it may be, if desired, next to the opposite edge of the film. Together the sprocket holes and the sound track take up about one-quarter inch of the film width, leaving about one and three thirty-seconds inch, with clearance, between the sound track and the opposite film edge for the exposure areas.

The intermittent claw movement of the film is shown as standard, 0.748 inch, and that leaves approximately 0.748 inch for the vertical exposure area dimension. In FIG. 2 the exposure area is shown at 40 with its lower line above the center line of lower pilot pin 32. FIG. 2a shows the lower line of the exposure area 40 at the lower pilot pin center. In general, the exposure area of the film should preferably be, at least in part, between the two pilot pin centers, FIG. 1 shows the exposure aperture 33 located in aperture plate 34 in accordance with FIG. 2. The film is held against the aperture plate in the usual manner, usually by a roller equipped pressure plate.

It will be understood that the driving connections between the film moving claw mechanism 20 and the pilot device 28 are, as usual, preferably such that the pilot pins 30 and 32 move into and out of the film perforations as the claw pins 22 and 24 move out and in, so that the film and its exposure areas are accurately registered by the pilot. Registration by the pilot is more accurate than as by the film moving pins, as the pilot pins are guided, as by guides 29, to have movements only to and from the film.

FIGS. 3 and 4 show, in enlargement, how the pilot pins, and preferably the claw pins, engage their film perforations. FIG. 3 shows, preferably for an upper pilot pin 30 and a lower claw pin 24, how the pin engages tightly in its film perforation 26c or 26b laterally of the film, but loosely in a direction longitudinal of the film. FIG. 4 shows, preferably for a lower pilot pin 32 and upper claw pin 22, how the pins fit tightly in their perforations 26d and 26a in both directions laterally and longitudinally of the film. It is preferred to have the full fitting pilot and claw pins close together to offset film shrinkage. As will be seen from this preferred description, the two full fitting pins are longitudinally close together and the longitudinal spacings of the other of the pin-sets are longitudinally opposite to each other.

With the pilot pin 32 fitting its perforation closely, and preferably the claw pin 22 doing the same, pilot pin 32 registers the film and its exposure area in full accuracy both laterally and longitudinally of the film. Claw pin 22 preferably does the same. The other pilot pin 30 accurately registers the film and its exposure area only laterally of the film, allowing for longitudinal film expansion or contraction between the widely spaced pins. With the exposure area located preferably at least in part between those two widely spaced pilot pins, that exposure area is accurately located because of the relatively wide spacing of the two pins. The widely spaced claw pins preferably do the same thing, but not as accurately as can be done by the pilot pins. The exposure area—the exposure aperture—is preferably close to the lower full-fitting pilot pin.

As shown here for 35 mm. film there are standardly four perforations 26 for each intermittent film movement. That is to say, the film moves a distance of four perforations during each advancement. Other, smaller, films may have as little as one perforation per film movement or possible exposure area. The longitudinal spacings of the pilot pins, and preferably also of the claw pins, is in any case preferably at least as great or greater than the longitudinal dimension of the intermittent film movement or exposure area. As shown here for 35 mm. film, the pilot pins have a longitudinal spacing of six sprocket holes, the claw pins of five, there being four sprocket holes for each film movement or exposure area.

I claim:
1. Intermittent film transport and register mechanism including a claw pin mechanism and a pilot pin mechanism synchronzed and adapted for alternately moving a perforated motion picture film strip by its perforations a fixed distance, and engaging its perforations to hold it steady between movements,
  said motion picture film strip having a series of longitudinally spaced perforations in a single row close to one lateral edge thereof,
  a pair of perforation engageable pilot pins on said pilot pin mechanism spaced longitudinally of the film strip, said pilot pins being spaced longitudinally of the film strip to simultaneously engage two longitudinally spaced perforations of the film strip, one of said pilot pins fitting said perforations accurately both longitudinally and laterally of the film strip, and the other of said pilot pins fitting the perforations only laterally of the film strip, and
  a pair of perforation engageable claw pins on said claw pin mechanism spaced longitudinally of the film strip from said pilot pins, and also spaced longitudinally relative to said perforations, to simultaneously engage two longitudinally spaced perforations of the film strip positioned by said pilot pins, one of said claw pins fitting said perforations accurately both longitudinally and laterally of the film strip, and the other of said claw pins fitting said perforations only laterally of the film strip.

2. The subject matter of claim 1, wherein the longitudinal spacing of the two pilot pins is at least equal to the fixed distance of movement of the film strip by the claw pin mechanism.

3. The subject matter of claim 1, wherein the full-fitting pilot and claw pins that fit the perforations accurately both longitudinally and laterally of the film strip are located longitudinally next to one another, and the other pilot and claw pins are longitudinally spaced from said full-fitting pilot and claw pins in opposite longitudinal directions.

4. The subject matter of claim 2, wherein the full-fitting pilot and claw pins that fit the perforations accurately both longitudinally and laterally of the film strip are located longitudinally next to one another, and the other pilot and claw pins are longitudinally spaced from said full-fitting pilot and claw pins in opposite longitudinal directions.

References Cited
UNITED STATES PATENTS

| | | | |
|---|---|---|---|
| 2,506,649 | 5/1950 | Reeves | 226—56 |
| 2,733,633 | 2/1956 | Wottring | 352—192 |
| 2,986,316 | 5/1961 | Petersen | 226—57 |
| 3,061,160 | 10/1962 | Elsas | 226—58 |

NORTON ANSHER, Primary Examiner.

M. H. HAYES, Assistant Examiner.

U.S. Cl. X.R.

226—55